Sept. 15, 1964  J. C. KOCHER  3,149,332
RADAR ISOECHO CONTOUR SENSITIVITY GATE
Filed Sept. 10, 1962
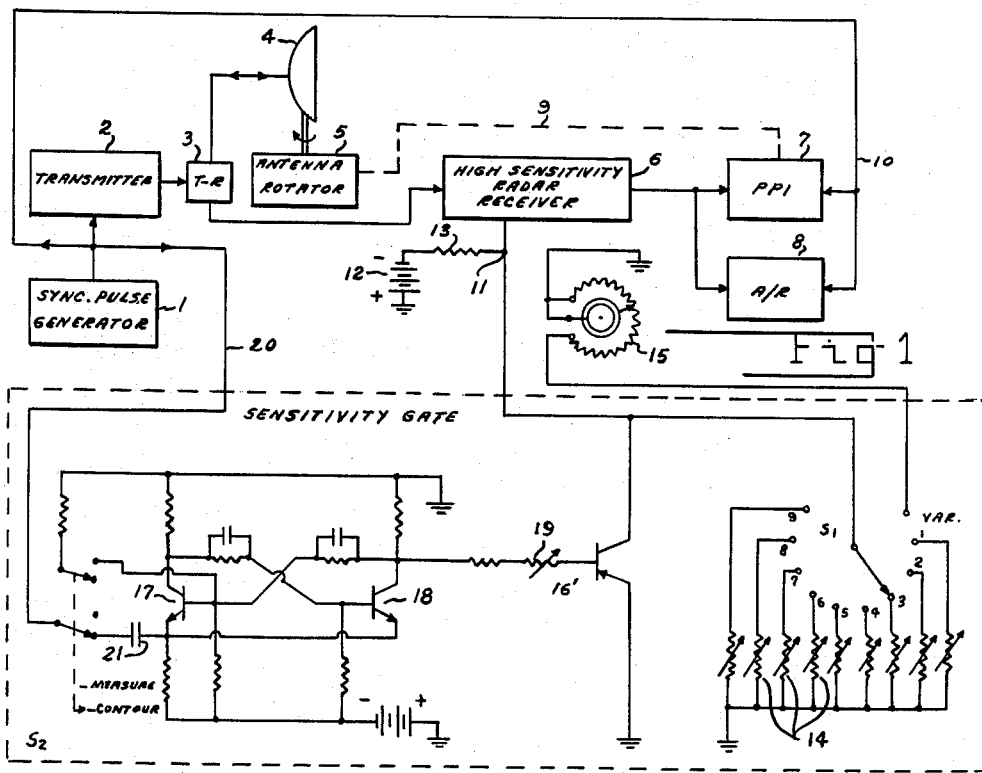
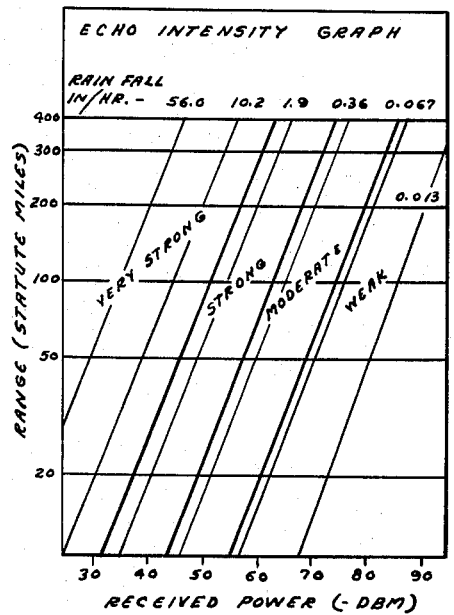
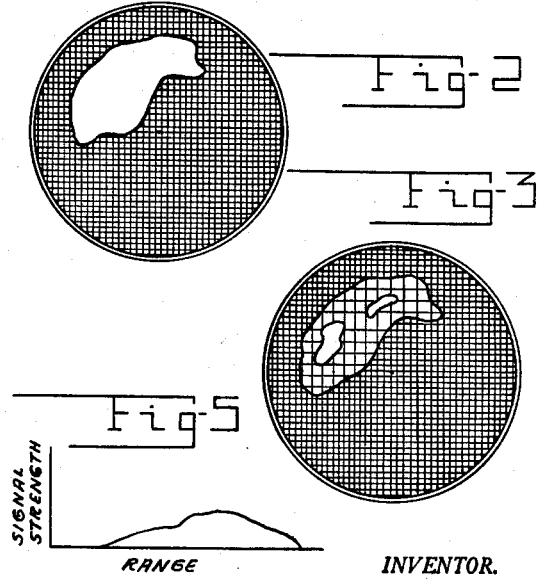
INVENTOR.
J. C. KOCHER

United States Patent Office 3,149,332
Patented Sept. 15, 1964

3,149,332
RADAR ISOECHO CONTOUR SENSITIVITY GATE
John C. Kocher, Humboldt, Iowa (Det. 5, 1st Weather
Wing, A.P.O. 74, San Francisco, Calif.)
Filed Sept. 10, 1962, Ser. No. 222,746
6 Claims. (Cl. 343—17.1)
(Granted under Title 35, U.S. Code (1952), sec. 266)

The invention described herein may be manufactured and used by or for the United States Government for governmental purposes without payment to me of any royalty thereon.

This invention relates to weather radar systems of the long range type employing ultrasensitive receivers and has as its purpose the provision of simple means for use in such systems to permit the contour mapping of storms with a natural display, i.e., a display in which the brightest area represents the area of greatest storm intensity, and to permit the measurement of storm intensity.

When a receiver of very high sensitivity is used in a weather radar the dynamic range of the video output of the receiver is narrow. The reason for this is that with high receiver sensitivity all but the very weakest echoes saturate the receiver and produce outputs of the same level. Under these conditions a storm display is of uniform high brightness over almost the entire area and gives little information as to the intensity distribution. Further, the usual technique of applying amplitude discrimination to the video signal for the purpose of contouring the display is not feasible with a nearly constant level video output.

In accordance with the invention, a simple apparatus is provided for switching the receiver sensitivity between maximum and intermediate values in synchronism with the radiated pulses of the radar in such manner that during one set of alternate pulse repetition intervals the receiver has maximum gain and during the other set of alternate pulse repetition intervals the receiver has an intermediate value of gain. With this arrangement, all echoes are displayed during the intervals when the receiver has maximum gain but only the stronger echoes are displayed during the intervals of intermediate receiver gain. Consequently, echoes above a predetermined magnitude, as determined by the intermediate gain setting, are displayed during each pulse repetition interval, whereas echoes below this level are displayed only during alternate pulse repetition periods. As the result, the area of the storm giving rise to the stronger echoes appears with full brightness and the remainder of the storm area appears with reduced brightness. There are also provided means for switching the intermediate sensitivity setting of the receiver to any of a plurality of calibrated values so that determinations of actual storm intensity may be made from measurements of range and received echo magnitude.

A more detailed description of the invention will be made with reference to the specific embodiment thereof shown in the accompanying drawing in which:

FIG. 1 shows a weather radar system incorporating the invention;

FIG. 2 illustrates the display of a storm in a long range weather radar with ultrasensitive receiver;

FIG. 3 illustrates the display of a storm after adding the invention to the radar providing the display of FIG. 2;

FIG. 4 illustrates a typical echo intensity graph used to determine storm intensity from range and echo magnitude measurements; and, FIG. 5 shows the A/R scope presentation.

Referring to FIG. 1, a synchronizing pulse generator 1 provides a series of equally spaced trigger pulses for the system. These pulses trigger transmitter 2 to apply short equally spaced pulses of high frequency energy through transmit-receive network 3 to directional scanning antenna 4 for radiation in a beam that is narrow in the horizontal plane. Generally, this antenna scans 360° in azimuth by being rotated at constant speed by a suitable rotating mechanism 5. Echoes of the radiated pulses, as from rain drops in a storm, are received by antenna 4 and directed through transmit-receive network 3 to the input of radar receiver 6. The video output of this receiver is applied to suitable display devices such as the PPI (plan position indicator) 7 and the A/R oscilloscope 8. As is well known in the art, the PPI displays the range and azimuth of the reflecting object and the A/R oscilloscope displays the range of the reflecting object and the magnitude of its echo. For these purposes the direction of the beam is made to correspond to the antenna direction by a suitable coupling 9 with the antenna rotator, and the range sweeps are initiated in synchronism with the radiated pulses by the trigger pulses applied over circuit 10.

The sensitivity of receiver 6 is determined by the negative bias voltage at point 11 which is derived from a potential divider connected across D.C. source 12 and consisting of resistor 13 and one of the resistors 14 or the variable resistor 15, depending upon the position of switch $S_1$. A switching transistor 16 is connected between point 11 and ground which places it in shunt to the divider resistor selected by $S_1$. The transistor 16 control circuit is so adjusted that when this transistor is conductive it shunts the divider resistor connected between point 11 and ground sufficiently to raise the bias potential at point 11 to the proper value for maximum receiver sensitivity. When transistor 16 is nonconductive the potential of point 11 is lowered below the maximum gain value to a value dependent upon the magnitude of whichever of resistors 14 or 15 is connected in circuit by $S_1$. The receiver will then have an intermediate value of gain as determined by the setting of $S_1$. In the embodiment shown, provision is made through resistors 14 for presetting the receiver to nine different intermediate values of sensitivity. Where $S_1$ is in the VAR. position, the intermediate sensitivity may be set at will to any desired value by the manually adjustable resistor 15.

The on-off condition of switching transistor 16 is controlled by a bistable circuit comprising transistors 17 and 18. This circuit has two stable states in each of which one transistor is conductive and the other is cut off. When transistor 18 is conductive (17 cut off) the base of transistor 16 is lowered below ground potential which results in an emitter current. This in turn causes a collector current to flow toward point 11 and thence through resistor 13 and source 12 to ground. This current raises the potential of point 11 by an amount depending upon its magnitude. The magnitude of the collector current depends upon the magnitude of the emitter current which can be controlled by variable resistor 19. Therefore, by adjusting resistor 19 and thereby the shunting effect of transistor 16 on the selected resistor 14 or 15, the bias potential at point 11 may be adjusted to the proper value for maximum or any other desired upper sensitivity level of the receiver. When transistor 18 is nonconductive (17 conductive) the base of transistor 16 is at ground potential so that no emitter current flows. Under this condition there is substantially no collector current and the transistor acts as a very high resistance with no significant shunting effect on the selected resistor 14 or 15. Consequently, the sensitivity of the receiver is determined by the resistor selected by $S_1$.

In order for the sensitivity of the receiver to alternate between maximum and intermediate values in successive pulse repetition intervals, the bistable circuit is triggered from its existing stable state to the other stable state at each transmitter pulse. For this purpose the synchronizing pulses from generator 1 are applied over line 20 and through condenser 21, when switch $S_2$ is in its CONTOUR position, to the emitters of transistors 17 and 18. At the occurrence of each synchronizing pulse the bistable circuit is triggered from whichever stable state it is in to the other, thus causing the receiver sensitivity to change from maximum to intermediate or from intermediate to maximum as the case may be.

FIGS. 2 and 3 show the effect of adding the above-described sensitivity gate to a conventional weather radar employing a very high gain receiver. FIG. 2 illustrates the PPI representation of a storm in a radar of this type. As stated before, with a receiver of very high sensitivity even the weakest echoes produce indications on the oscilloscope of the PPI and the stronger echoes drive the receiver into saturation. The result is receiver outputs of nearly equal intensity for all signal strengths. Therefore, very little contrast can be noted in the storm presentation on the PPI, the storm appearing as a large area of maximum brightness with little or no indication of its intensity variation, as seen in FIG. 2. When the sensitivity gate is added, as shown in FIG. 1, the receiver has a maximum gain and an intermediate gain, the latter depending upon the position of $S_1$, and is switched from whichever of these gain values it has at the time to the other at the start of each pulse repetition interval, as explained above in connection with FIG. 1. During the time of maximum gain all received echoes appear on the PPI whereas during the time of intermediate gain only received echoes having strengths above a given minimum strength, determined by the receiver gain, appear on the PPI. Consequently, echoes above the predetermined minimum appear on the PPI during each pulse repetition interval whereas echoes below this minimum appear only during alternate pulse repetition intervals. This results in the area or areas of the storm from which the stronger echoes are derived appearing as an area or areas of maximum brightness with the remainder of the storm appearing as an area of reduced brightness, as seen in FIG. 2. The boundary lines between these areas are isoecho contour lines. The storm intensity level at which the isoecho lines occur on the PPI is determined by the intermediate value of receiver gain. As the intermediate gain value is reduced the isoecho contour lines and the enclosed areas of maximum brightness on the PPI contact toward the areas of the storm having the highest intensity. The receiver intermediate gain value may be controlled by moving $S_1$ over its various contacts thus connecting resistors 14 of different values into circuit or, with $S_1$ in the VAR. position, by adjusting variable resistor 15.

The sensitivity gate may also be used to accurately measure the strength of a storm echo and, from this measurement and the range measurement provided by the radar, to determine the storm intensity in the area producing the echo by reference to a chart such as shown in FIG. 4 which relates storm intensity to received signal strength and range. For this purpose the switch $S_1$ is calibrated to show the receiver threshold for each position, the receiver threshold being the minimum received signal power capable of producing a receiver output. The thresholds may be conveniently designated in —dbm (decibels below one milliwatt). Since a contour line on the PPI is the dividing line between echoes above the receiver threshold and echoes below the receiver threshold, the storm intensity at any point on a contour line may be determined by ascertaining the range of the point from the PPI and the received signal strength from the position of $S_1$. Applying these two measurements to the chart in FIG. 4 gives the storm intensity at that point. Since the contour lines may be made to expand or contract by movement of $S_1$, the intensity over the entire storm area may be obtained in this manner.

If it is desired to eliminate the weaker returns from the PPI, or when using the A/R scope in intensity measurements, $S_2$ may be placed in the MEASURE position. In this position transistor 17 is biased to a conductive state which results in transistor 18 being cut off. As explained above, when transistor 18 is cut off the shunting effect of transistor 16 is removed and the gain of the receiver is held to the value established by the particular resistor 14 or 15 selected by $S_1$. When using the A/R scope, the envelope of the cross section of a storm in a particular direction from the radar may appear as in FIG. 5. In order to measure the storm intensity at a particular range in this direction, switch $S_1$ is adjusted until the echo at this range is reduced to zero. The position of $S_1$ when this occurs gives the received signal strength which, together with the range, may be applied to the chart of FIG. 4 to determine the intensity.

I claim:
1. A weather radar comprising means for generating and directionally radiating successive pulses of high frequency energy at a constant pulse repetition interval, means including a highly sensitive radar receiver for receiving echoes of said radiated energy, a cathode ray tube indicator coupled to the output of said receiver for displaying said echoes, receiver gain control means for selectively establishing a maximum value of receiver sensitivity and an intermediate value of receiver sensitivity, and means synchronized with said radiated pulses and coupled to said gain control means for holding the gain of said receiver constant at said maximum value of sensitivity during each of one set of alternate pulse repetition intervals and constant at said intermediate value of sensitivity during each of the other set of alternate pulse repetition intervals.

2. A weather radar comprising means for generating and directionally radiating successive pulses of high frequency energy at a constant pulse repetition interval, means including a highly sensitive radar receiver for receiving echoes of said radiated energy, a cathode ray tube indicator coupled to the output of said receiver for displaying said echoes, a source of direct current, a potential divider comprising a fixed resistance and a variable resistance connected in series across said source, means for applying the voltage across said variable resistance to said receiver as a gain control voltage, a shunting means connected across said variable resistance, and means synchronized with said radiated pulses for establishing a constant predetermined amount of conductivity in said shunting means during each of one set of alternate pulse repetition intervals and for establishing a substantially nonconductive condition in said shunting means during each of the other set of alternate pulse repetition intervals, said predetermined amount of conductivity being such as to provide a gain control voltage to said receiver producing maximum receiver sensitivity.

3. Apparatus as claimed in claim 2 in which said variable resistance is calibrated in receiver thresholds.

4. Apparatus as claimed in claim 2 in which said means synchronized with said radiated pulses is a bistable circuit triggered from whichever stable state it is in to the other stable state in coincidence with each radiated pulse.

5. A weather radar comprising means for generating and directionally radiating successive pulses of high frequency energy at a constant pulse repetition interval, means including a highly sensitive radar receiver for receiving echoes of said radiated energy, a cathode ray tube indicator coupled to the output of said receiver for displaying said echoes, a source of direct current, a potential divider comprising a fixed resistance and a variable resistance connected in series across said source, means for applying the voltage across said variable resistance to said receiver as a gain control voltage, a shunting means connected across said variable resistance, and a bistable circuit triggered from one state to the other at each radiated pulse for controlling said shunting means, said bistable circuit operating in one stable state to reduce the conductivity of said shunting means substantially to zero and in the other stable state to establish an amount of conductivity in said shunting means such that the gain control voltage developed across said variable resistance has the proper value to adjust the receiver gain to maximum.

6. Apparatus as claimed in claim 5 in which said shunting means is a transistor having its emitter-collector circuit connected across said variable resistance and having its emitter-base voltage controlled by said bistable circuit.

References Cited in the file of this patent

UNITED STATES PATENTS

| | | |
|---|---|---|
| 2,624,871 | Meagher | Jan. 6, 1953 |
| 2,624,875 | Patterson | Jan. 6, 1953 |
| 2,679,589 | Mack | May 25, 1954 |
| 3,108,269 | Collis | Oct. 22, 1963 |